US011872674B2

(12) United States Patent
Nick et al.

(10) Patent No.: US 11,872,674 B2
(45) Date of Patent: Jan. 16, 2024

(54) IMPACT TOOL ANVIL WITH FRICTION RING

(71) Applicant: MILWAUKEE ELECTRIC TOOL CORPORATION, Brookfield, WI (US)

(72) Inventors: Mackenzie J. Nick, Theresa, WI (US); Jacob P. Schneider, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 86 days.

(21) Appl. No.: 17/721,060

(22) Filed: Apr. 14, 2022

(65) Prior Publication Data

US 2022/0331937 A1 Oct. 20, 2022

Related U.S. Application Data

(60) Provisional application No. 63/208,806, filed on Jun. 9, 2021, provisional application No. 63/175,416, filed on Apr. 15, 2021.

(51) Int. Cl.
*B25B 21/02* (2006.01)
*B25B 23/00* (2006.01)

(52) U.S. Cl.
CPC .......... *B25B 23/0035* (2013.01); *B25B 21/02* (2013.01)

(58) Field of Classification Search
CPC ...................................................... B25B 21/02
USPC .......................................................... 173/210
See application file for complete search history.

(56) References Cited

U.S. PATENT DOCUMENTS

| | | | |
|---|---|---|---|
| 7,207,393 | B2 | 4/2007 | Clark, Jr. et al. |
| 7,249,638 | B2 | 7/2007 | Bodine et al. |
| 8,342,061 | B2 | 1/2013 | Super |
| 8,839,879 | B2 | 9/2014 | Elger et al. |
| 9,364,942 | B2 | 6/2016 | Puzio et al. |
| 10,040,178 | B2 | 8/2018 | Kondo et al. |
| 2007/0266545 | A1 | 11/2007 | Bodine et al. |
| 2013/0192860 | A1 | 8/2013 | Puzio et al. |
| 2014/0367130 | A1 | 12/2014 | Dougherty |
| 2017/0232602 | A1 | 8/2017 | Puzio et al. |

(Continued)

FOREIGN PATENT DOCUMENTS

| | | |
|---|---|---|
| CN | 205237922 U | 5/2016 |
| CN | 209425376 U | 9/2019 |

(Continued)

OTHER PUBLICATIONS

International Search Report and Written Opinion for Application No. PCT/US2022/024862 dated Jul. 28, 2022 (10 pages).

*Primary Examiner* — Praachi M Pathak
(74) *Attorney, Agent, or Firm* — Michael Best & Friedrich LLP

(57) ABSTRACT

An impact tool includes a housing, a motor supported within the housing, an anvil extending from the housing, and a drive assembly configured to convert a continuous rotational input from the motor to intermittent applications of torque to the anvil. The anvil includes a body rotatable about a longitudinal axis, a driving end portion configured to receive a tool element over a distal end thereof, and a bore extending through the driving end portion of the anvil in a direction transverse to the longitudinal axis. The driving end portion includes a groove located between the bore and the distal end. The groove includes a curved portion converging toward the distal end and is configured to receive a friction ring such that the friction ring follows a contour of the groove.

20 Claims, 8 Drawing Sheets

(56) References Cited

U.S. PATENT DOCUMENTS

| | | | |
|---|---|---|---|
| 2019/0247985 | A1 | 8/2019 | Xu et al. |
| 2020/0215678 | A1 | 7/2020 | Nakashima |
| 2020/0217412 | A1 | 7/2020 | Nakashima |
| 2021/0060741 | A1 | 3/2021 | Kusumoto et al. |

FOREIGN PATENT DOCUMENTS

| | | | |
|---|---|---|---|
| EP | 1679158 | B1 | 8/2008 |
| EP | 3689547 | A1 | 8/2020 |
| JP | 2019150942 | A | 9/2019 |
| JP | 3076432 | U | 4/2021 |

IMPACT TOOL ANVIL WITH FRICTION RING

CROSS-REFERENCE TO RELATED APPLICATIONS

This application claims priority to U.S. Provisional Patent Application No. 63/175,416, filed Apr. 15, 2021, and to U.S. Provisional Patent Application No. 63/208,806, filed Jun. 9, 2021, the entire contents of which are incorporated herein by reference.

FIELD

The present disclosure relates to impact tools, and, more particularly, to anvils for impact tools.

BACKGROUND

Impact tools, such as impact wrenches, provide a striking rotational force, or intermittent applications of torque, to a tool element or workpiece (e.g., a fastener) to either tighten or loosen the fastener. Impact wrenches are typically used where high torque is needed, such as to tighten relatively large fasteners or to loosen or remove stuck fasteners (e.g., an automobile lug nut on an axle stud) that are otherwise not removable or very difficult to remove using hand tools.

SUMMARY

The disclosure provides, in one aspect, an impact tool including a housing, a motor supported within the housing, an anvil extending from the housing, the anvil including a body rotatable about a longitudinal axis, a driving end portion configured to receive a tool element over a distal end thereof, and a bore extending through the driving end portion of the anvil in a direction transverse to the longitudinal axis. The driving end portion includes a groove located between the recess and the distal end. The groove includes a curved portion converging toward the distal end, and the groove is configured to receive a friction ring such that the friction ring follows a contour of the groove. The impact tool further includes a drive assembly configured to convert a continuous rotational input from the motor to intermittent applications of torque to the anvil, the drive assembly including a camshaft driven by the motor and a hammer configured to reciprocate along the camshaft.

The disclosure provides, in another aspect, an impact tool including a housing, a motor supported within the housing, and a driving end portion extending from the housing along a longitudinal axis and configured to receive a tool element over a distal end thereof. The tool element is rotatable with the driving end portion in response to operation of the motor. The driving end portion includes a plurality of sides defining an outer perimeter having a first width, a head defining an inner perimeter having a second width less than the first width, the head offset relative to the plurality of sides along the longitudinal axis, and a groove shaped to receive a friction ring configured to engage the tool element, the groove including a linear portion adjacent a first side of the plurality of sides and a curved portion adjacent a second side of the plurality of sides. One of the linear portion and the curved portion is delimited by a surface of the head between the distal end and the plurality of sides along the longitudinal axis, and the other of the linear portion and the curved portion is open to the distal end.

The disclosure provides, in another aspect, an impact tool including a housing, a motor supported within the housing, an anvil extending from the housing, the anvil configured to receive a tool element over a distal end thereof, and a drive assembly configured to convert a continuous rotational input from the motor to intermittent applications of torque to the anvil. The anvil includes a bore extending therethrough, a curvilinear groove wrapping around the anvil between the bore and the distal end, and a curved support section formed between the bore and the curvilinear groove. The curved support section protrudes into the groove to form a curved wall of the curvilinear groove, and the curvilinear groove is configured to receive a friction ring that follows a contour of the curved support section.

Other aspects of the disclosure will become apparent by consideration of the detailed description and accompanying drawings.

BRIEF DESCRIPTION OF THE DRAWINGS

FIG. 6A is an enlarged perspective view of a driving end portion of the anvil of

FIG. 4.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
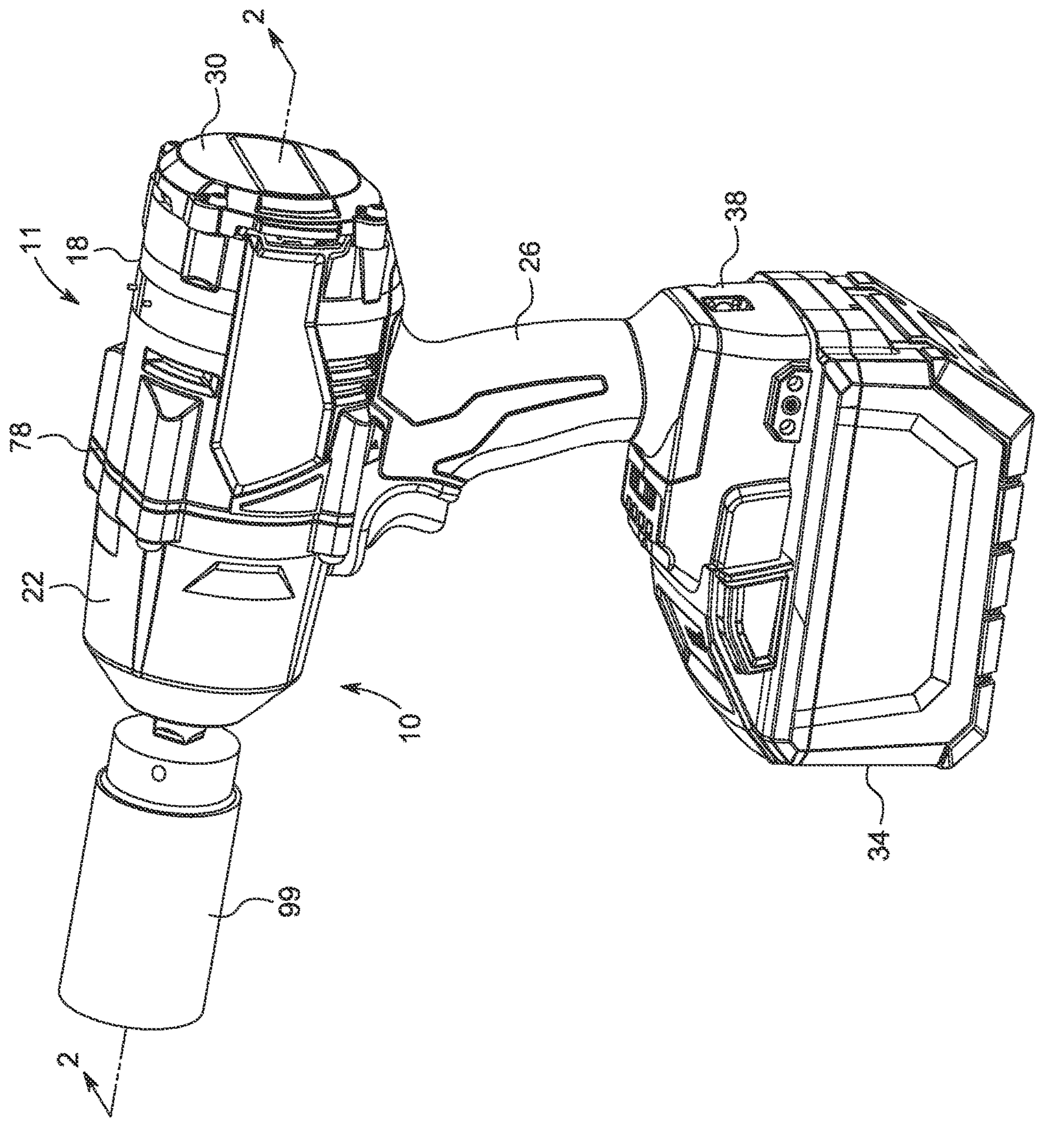
FIG. 1 is a perspective view of an impact tool according to an embodiment of the present disclosure.

FIG. 1 illustrates an impact tool in the form of an impact wrench 10. The impact wrench 10 includes a housing 14 with a motor housing portion 18, a front housing portion 22 coupled to the motor housing portion 18 (e.g., by a plurality of fasteners), and a handle portion 26 extending downward from the motor housing portion 18. In the illustrated embodiment, the handle portion 26 and the motor housing portion 18 are defined by cooperating clamshell halves. The housing 14 also includes an end cap 30 coupled to the motor housing portion 18 opposite the front housing portion 22.

Figure 2:
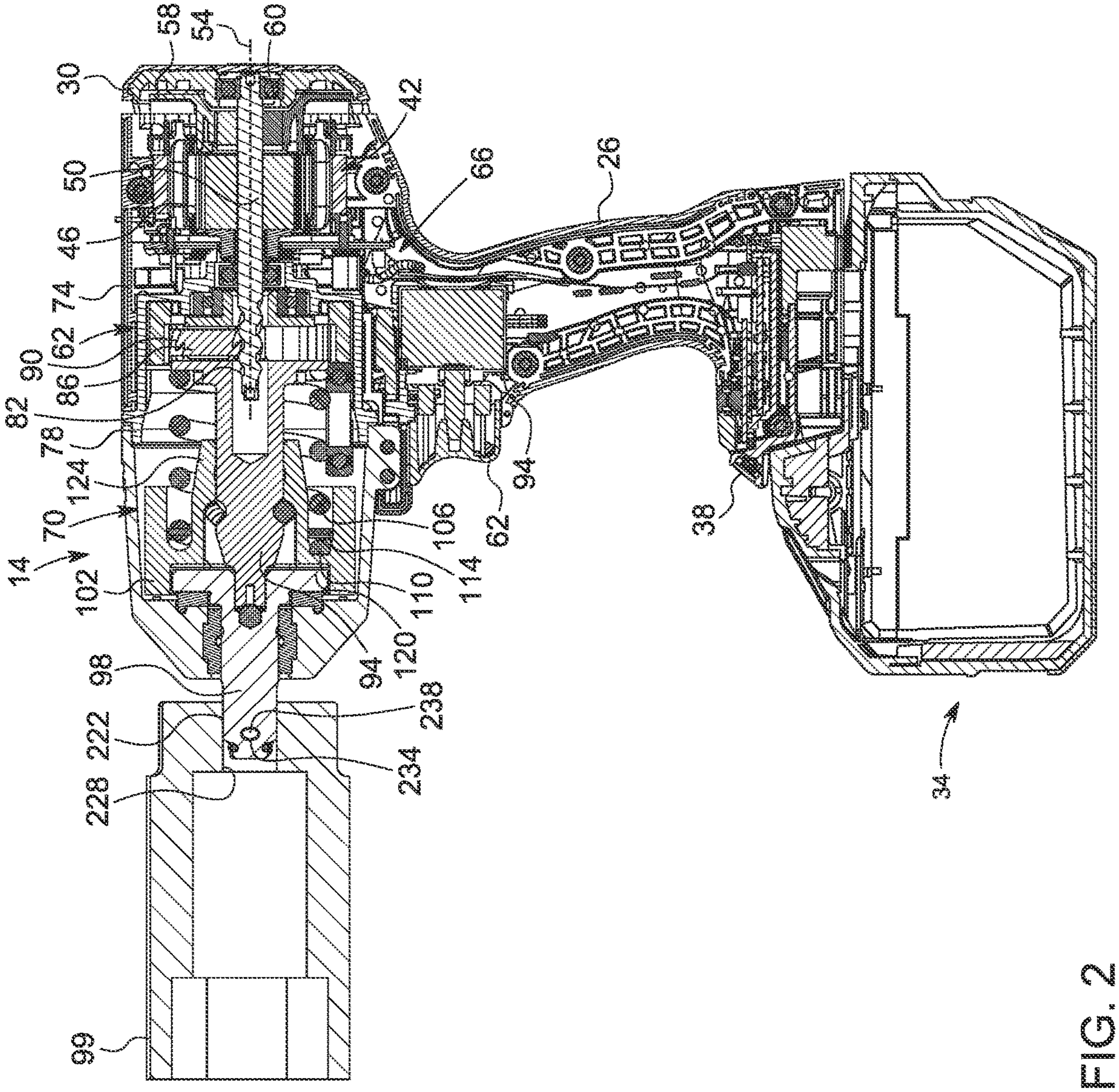
FIG. 2 is a cross-sectional view of the impact tool of FIG. 1, taken along line 2-2 in FIG. 1.

Referring to FIGS. 1 and 2, the impact wrench 10 has a battery 34 removably coupled to a battery receptacle 38 located at a bottom end of the handle portion 26. A motor 42, supported within the motor housing portion 18, receives power from the battery 34 via the battery receptacle 38 when the battery 34 is coupled to the battery receptacle 38. In the illustrated embodiment, the motor 42 is a brushless direct current ("BLDC") electric motor with a stator 46 and a rotor or output shaft 50 that is rotatable about an axis 54 relative to the stator 46. In other embodiments, other types of motors may be used. A fan 58 is coupled to the output shaft 50 (e.g., via a splined member 60 fixed to the output shaft 50) behind the motor 42.

The impact wrench 10 also includes a switch 62 (e.g., trigger switch) supported by the housing 14 for operating the motor 42 (e.g., via suitable control circuitry provided on one or more printed circuit board assemblies ("PCBAs") that control power supply and command of the motor 42. In other embodiments, the impact wrench 10 may include a power cord for connecting to a source of AC power. As a further alternative, the impact wrench 10 may be configured to operate using a non-electrical power source (e.g., a pneumatic or hydraulic power source, etc.).

Referring to FIG. 2, the impact wrench 10 further includes a gear assembly 66 coupled to the output shaft 50 of the motor 42 and a drive assembly 70 coupled to an output of the gear assembly 66. The gear assembly 66 may be configured in any of a number of different ways to provide a speed reduction between the output shaft 50 and an input of the drive assembly 70. The gear assembly 66 is at least partially housed within a gear case 74 fixed to the housing 14. In the illustrated embodiment, the gear case 74 includes an outer flange 78 that may be sandwiched between the front housing portion 22 and the motor housing portion 18. The fasteners that secure the front housing portion 22 to the motor housing portion 18 also pass through the outer flange 78 of the gear case 74 to fix the gear case 74 relative to the housing 14. In some embodiments, the gear case 74 may be at least partially defined by the front housing portion 22 and/or the motor housing portion 18.

The gear assembly 66 includes a pinion 82 formed on the output shaft 50, a plurality of planet gears 86 meshed with the pinion 82, and a ring gear 90 meshed with the planet gears 86 and rotationally fixed within the gear case 74. The planet gears 86 are mounted on a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotate the camshaft 94.

The drive assembly 70 further includes an anvil 98 and a hammer 102 supported on and axially slidable relative to the camshaft 94. The anvil 98 extends from the front housing portion 22. A tool element 99 can be coupled to the anvil 98 for performing work on a workpiece (e.g., a fastener, socket, bit, or the like). The drive assembly 70 is configured to convert the constant rotational force or torque provided by motor 42 via the gear assembly 66 to a striking rotational force or intermittent applications of torque to the anvil 98 when the reaction torque on the anvil 98 (e.g., due to engagement between the tool element 99 and a fastener being worked upon) exceeds a certain threshold.

With continued reference to FIG. 2, the drive assembly 70 further includes a spring 106 biasing the hammer 102 toward the front of the impact wrench 10 (i.e., in the left direction of FIG. 2). In other words, the spring 106 biases the hammer 102 in an axial direction toward the anvil 98, along the axis 54. A thrust bearing 110 and a thrust washer 114 are positioned between the spring 106 and the hammer 102. The thrust bearing 110 and the thrust washer 114 allow for the spring 106 and the camshaft 94 to continue to rotate relative to the hammer 102 after each impact strike when hammer lugs 112 on the hammer 102 (FIG. 7) engage with corresponding anvil lugs 120 and rotation of the hammer 102 momentarily stops. The camshaft 94 further includes cam grooves 124 in which corresponding cam balls (not shown) are received. The cam balls are in driving engagement with the hammer 102 and movement of the cam balls within the cam grooves 124 allows for relative axial movement of the hammer 102 along the camshaft 94 when the hammer lugs and the anvil lugs 120 are engaged and the camshaft 94 continues to rotate.

In operation of the impact wrench 10, an operator depresses the switch 62 to activate the motor 42, which continuously drives the gear assembly 66 and the camshaft 94 via the output shaft 50. As the camshaft 94 rotates, the cam balls drive the hammer 102 to co-rotate with the camshaft 94, and the drive surfaces of hammer lugs engage, respectively, the driven surfaces of the anvil lugs 120 to provide an impact and to rotatably drive the anvil 98 and the tool element. After each impact, the hammer 102 moves or slides rearward along the camshaft 94, away from the anvil 98, so that the hammer lugs disengage the anvil lugs 120. As the hammer 102 moves rearward, the cam balls situated in the respective cam grooves 124 in the camshaft 94 move rearward in the cam grooves 124. The spring 106 stores some of the rearward energy of the hammer 102 to provide a return mechanism for the hammer 102. After the hammer lugs disengage the respective anvil lugs 120, the hammer 102 continues to rotate and moves or slides forwardly, toward the anvil 98, as the spring 106 releases its stored energy, until the drive surfaces of the hammer lugs re-engage the driven surfaces of the anvil lugs 120 to cause another impact.

FIGS. 4-8 illustrate an embodiment of the anvil 98 in more detail. Although the anvil 98 is described above with reference to the impact wrench 10, the anvil 98 may be incorporated into other rotary impact tools. Furthermore, features of the anvil 98, and particularly tool element retaining features of the anvil 98 described in greater detail below, may be incorporated into other fastener driver tools, such as ratchet wrenches, socket-driving adapters for drills, and the like.

Figure 4:
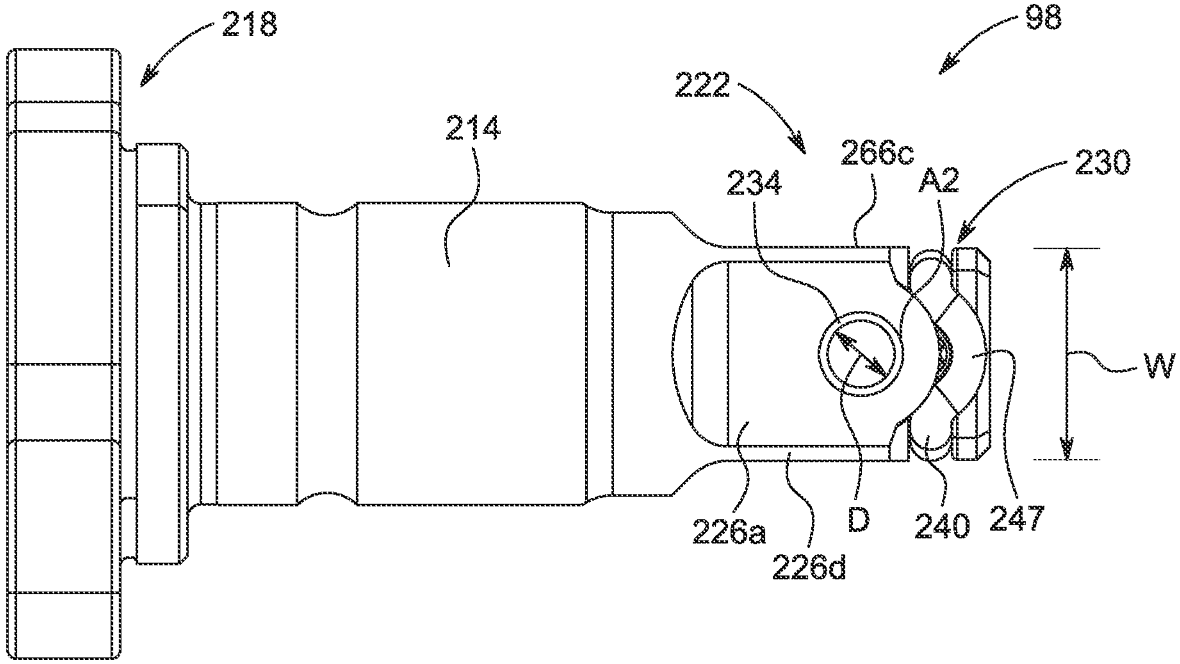
FIG. 4 is a side view of an anvil according to an embodiment of the present disclosure that is usable with the impact tool of FIG. 1.

With reference to FIG. 4, the anvil 98 includes a body 214 having an impact receiving portion 218 and a driving end portion 222 opposite the impact receiving portion 218. The driving end portion 222 of the anvil 98, like the exemplary anvil **98*a*, has a generally square cross-sectional shape, with sides 226*a*, 226*b*, 226*c*, 226*d* defining a nominal size or width W. In the illustrated embodiment, the sides 226*a*, 226*b*, 226*c*, 226*d* are four equal-length sides that define a perimeter of a part of the driving end portion 222**.

The driving end portion 222 is configured to interface with a tool element, such as the tool element 99 illustrated in FIGS. 1-2, so that that the tool element 99 is coupled for co-rotation with the anvil 98. More specifically, the tool element 99 includes a drive bore 228 (FIG. 2) with a shape and size corresponding to the shape and size of the driving end portion 222. As such, the driving end portion 222 of the anvil 98 is insertable into the drive bore 228 to couple the tool element 99 to the anvil 98.

Figure 7:
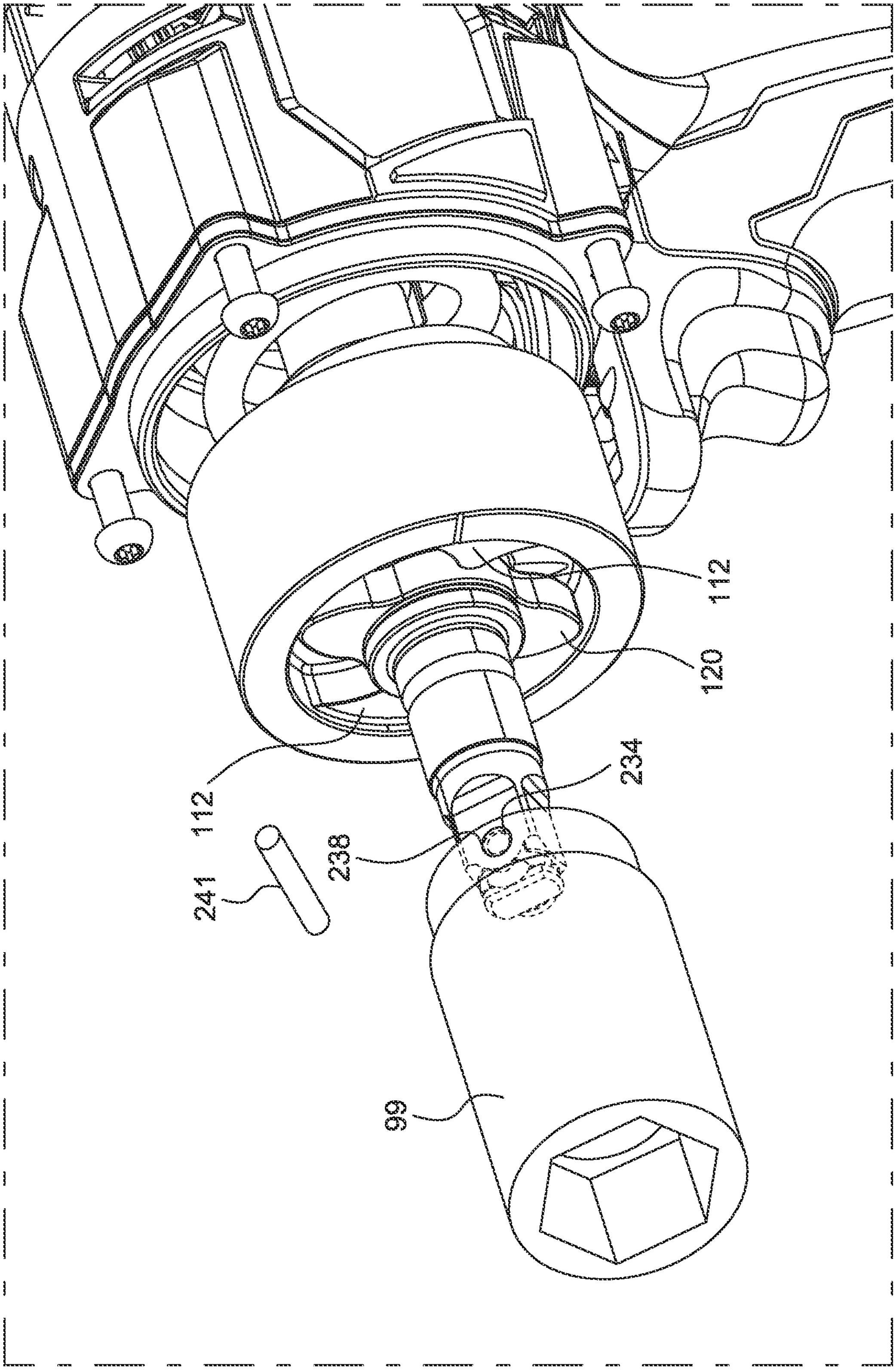
FIG. 7 is a perspective view of the anvil of FIG. 4 supported on the impact tool of FIG. 1, illustrating a pin engagement between a tool element and the anvil.
Figure 8:
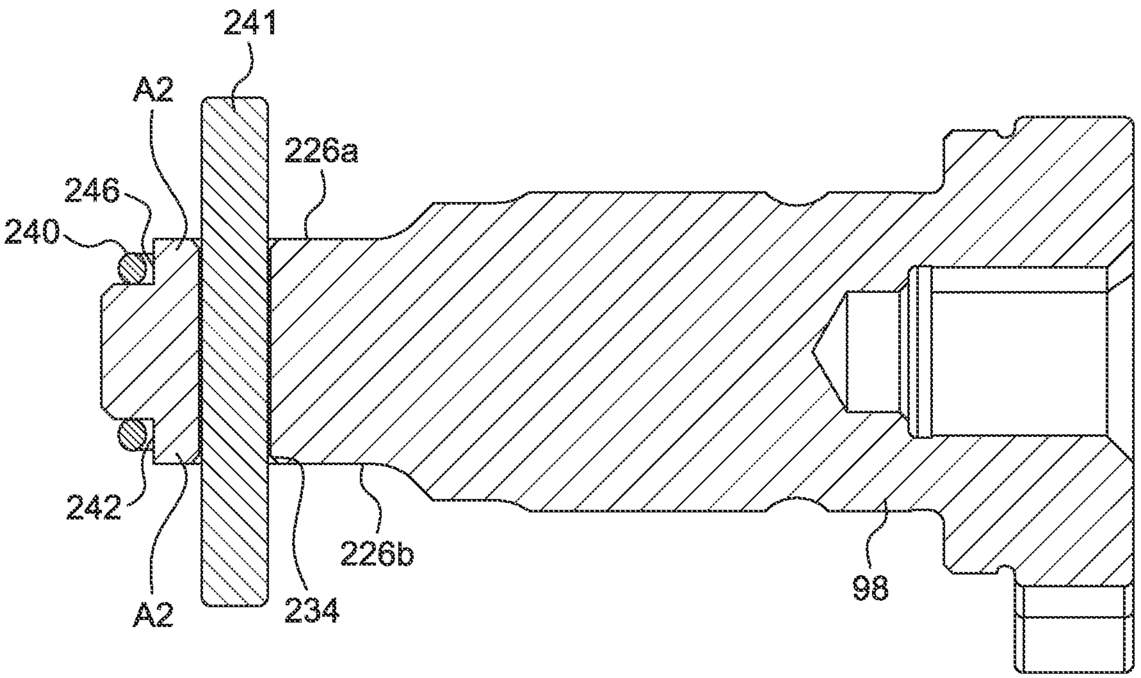
FIG. 8 is cross-sectional view of the anvil of FIG. 4, taken along a line bisecting a through-hole formed in the anvil.

The tool element 99 may be retained on the anvil 98 in different ways. For example, referring to FIG. 4, the driving end portion 222 includes a groove 230 that receives a friction ring 240 (e.g., an o-ring). The friction ring 240 is made of rubber or another suitable high-friction material and engages the walls of the drive bore 228 of the tool element 99 to retain the tool element 99 on the anvil 98 by friction. The driving end portion 222 also includes a bore 234 configured to align with and be complimentary to a bore 238 formed in the tool element 99. The bore 234 is a through-hole in the illustrated embodiment and extends through two opposite sides 226*a-b* of the driving end portion 222 (FIG. 8). A pin 241 may be inserted through the bore 238 of the tool element 99 and the bore 234 of the anvil 98 to retain the tool element 99 on the anvil 98 (FIG. 7).

Figure 5:
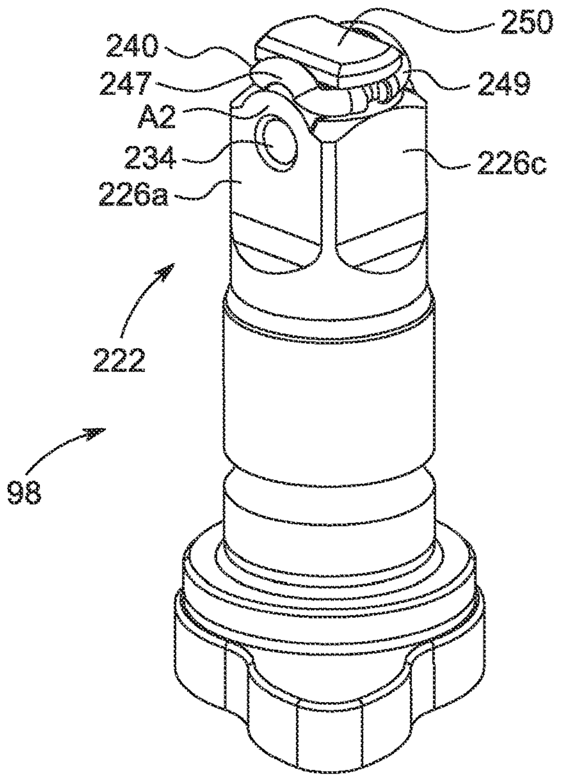
FIG. 5 is a perspective view of the anvil of FIG. 4.

The groove 230 has a non-linear or curved profile when viewed in a plan view, resulting in a corresponding curving of the friction ring 240 received in the groove 230. More specifically, with reference to FIGS. 6A-6B, the groove 230 is partially defined by a first curved wall 242 extending from the first side 226*a* of the driving end portion 222 (FIG. 6B) and a second curved wall 246 extending from the second side 226*b* of the driving end portion 222 (FIG. 6A). The first and second curved walls 242, 246 curve outwardly (i.e. away from the bore 234 and toward a distal end surface 250 of the anvil 98). The friction ring 240 includes a first curved section 247 extending along the first curved wall 242 and a second curved section 249 extending along the second curved wall 246 (FIG. 5). The friction ring 240 further includes a first intermediate section 251 and a second intermediate section 253 extending between the first curved section 247 and second curved section 249. The first and second curved sections 247, 249 and the first and second intermediate sections 251, 253 collectively define a circumference of the friction ring 240.

Figure 6:
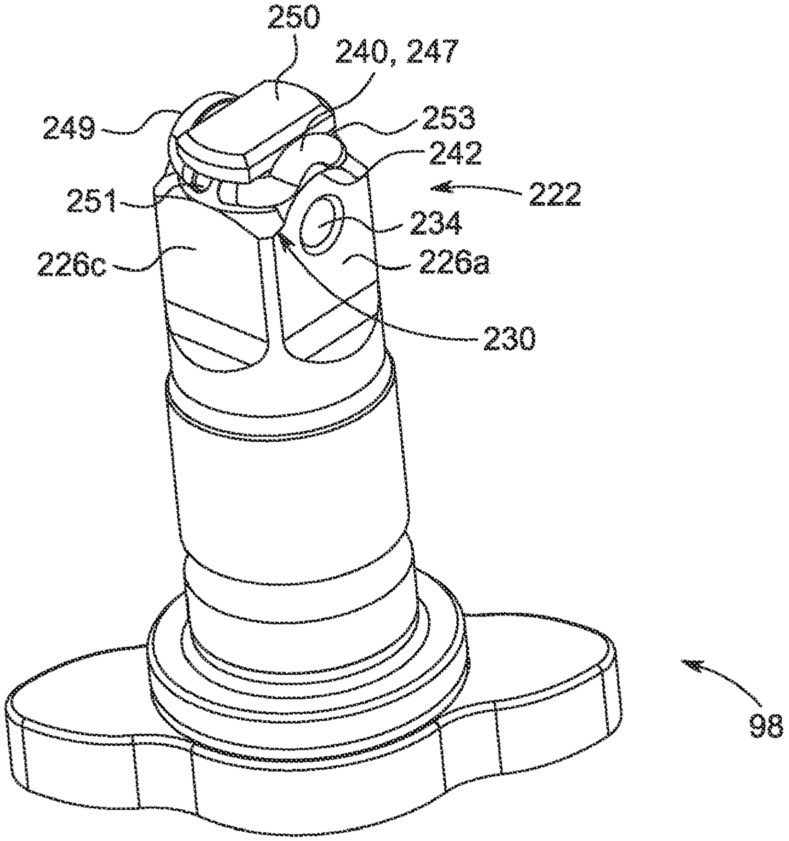
FIG. 6 is another perspective view of the anvil of FIG. 4.
Figure 6A:
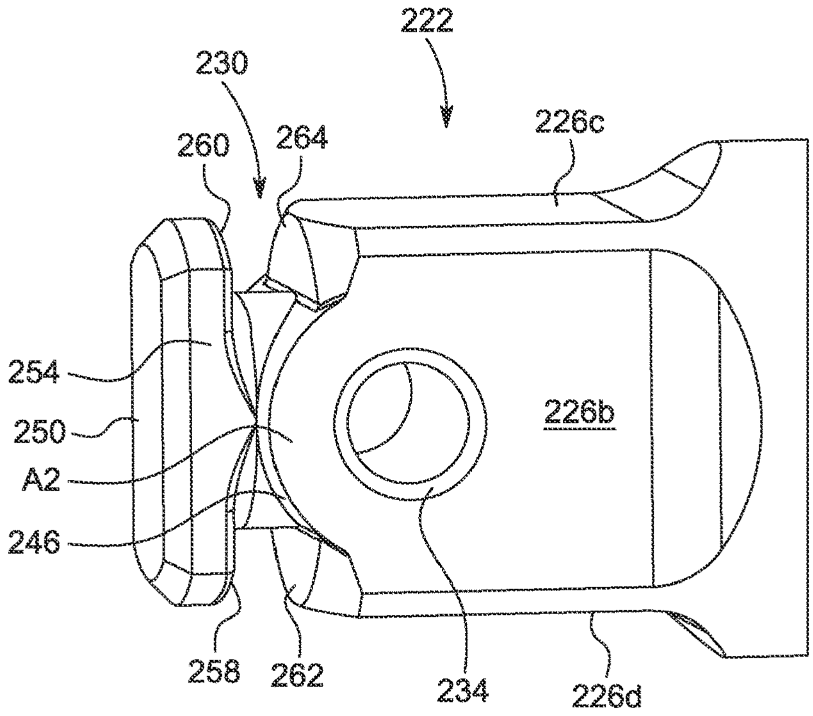
Figure 6B:
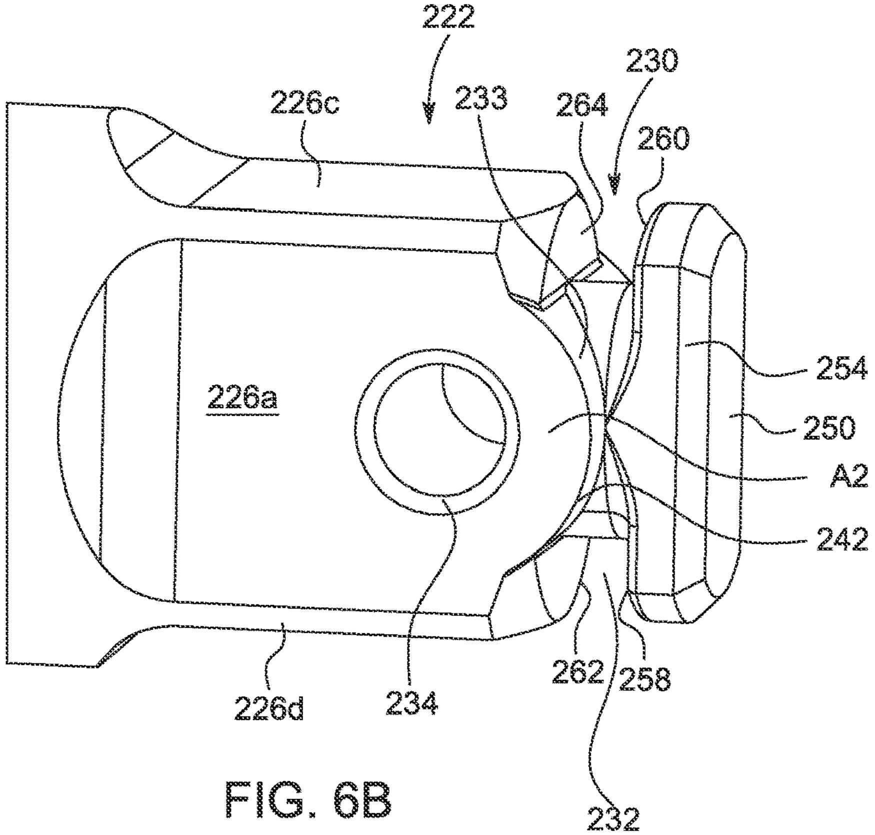
FIG. 6B is another enlarged perspective view of the driving end portion of the anvil of FIG. 4.
Figure 6C:
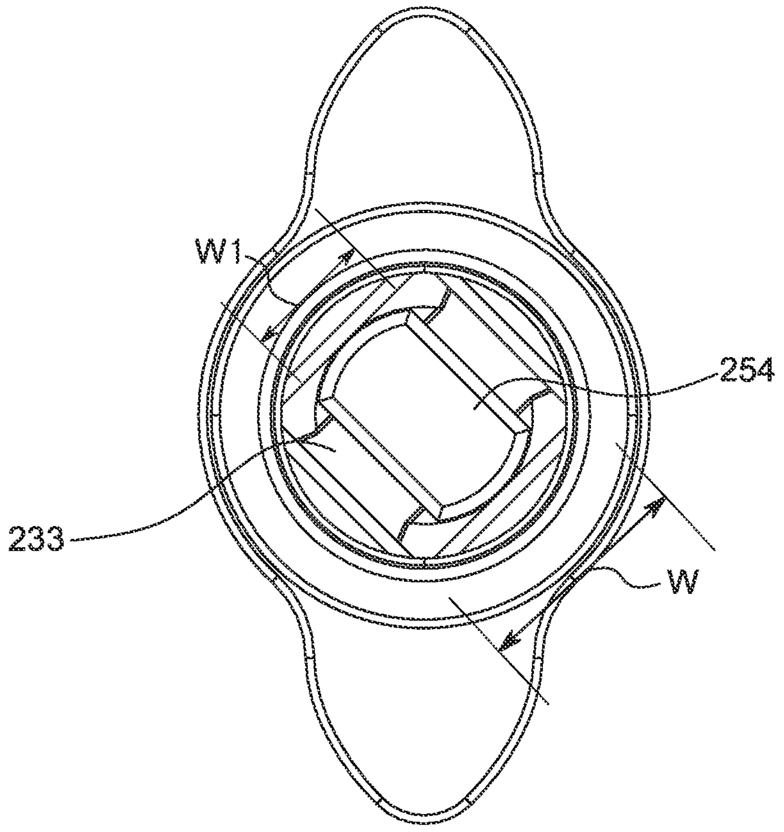
FIG. 6C is top view of the anvil of FIG. 4.

With reference to FIGS. 6A-6C, the driving end portion 222 of the anvil 98 further includes a head 254 defining the distal end surface 250 of the anvil 98. In the illustrated embodiment, the head 254 is generally T-shaped. The head 254 includes first and second inner surfaces 258, 260 opposite the distal end surface 250. The first and second inner surfaces 258, 260 oppose first and second facing surfaces 262, 264, which extend inwardly from the respective fourth and third sides 226*d*, 226*c* of the driving end portion 222. In the illustrated embodiment, the head 254 defines an inner perimeter relative to the outer perimeter defined by the sides 226*a*, 226*b*, 226*c*, 226*d*. The inner perimeter is positioned generally centrally within the outer perimeter and has a head width W1 that is less than the width W of the sides 226*a*, 226*b*, 226*c*, 226*d*.

The first and second inner surfaces 258, 260 are spaced from the first and second facing surfaces 262, 264 to define channels 232 therebetween, which receive and constrain the respective first and second intermediate sections 251, 253 of the friction ring 240 (FIGS. 5-6C). The channels 232 and the first and second curved walls 242, 246 collectively define the groove 230. The first and second curved walls 242, 246 may not be delimited by the surfaces (e.g., first and second inner surfaces 258, 260, first and second facing surfaces 262, 264) in regions between the channels 232 to define open regions 233 exposed toward the distal end surface 250. The open regions 233 of the groove 230 may extend along the first and second curved walls 242, 246 and permit flexure of the friction ring 240.

Abutting surfaces or connections in the illustrated embodiment may be chamfered, smoothed, beveled, or the like. For example, edge surfaces of the head 254 may be chamfered for strength and usability purposes (e.g., installation of the friction ring 240, engagement between anvil 98 and tool element 99, etc.). In some instances, providing such chamfering increases a strength/durability of the anvil 98.

Figure 3:
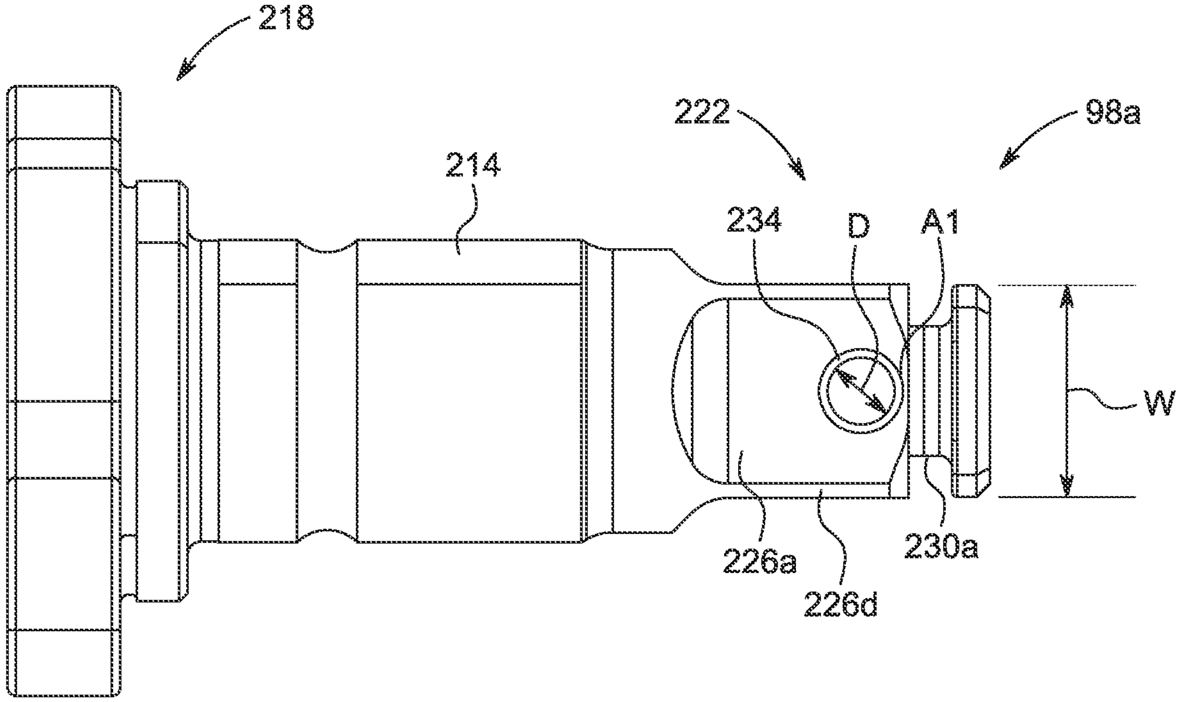
FIG. 3 is a side view of an exemplary anvil including a through-hole positioned in close proximity to a retaining ring groove.

Because the first and second curved walls 242, 246 curve outwardly (i.e. away from the bore 234 and toward a distal end surface 250 of the anvil 98), there is a greater material thickness in an area A2 between the bore 234 and the groove 230 as compared to an exemplary anvil 98*a*, (illustrated in FIG. 3), which has a groove 230*a* with a linear profile when viewed in a plan view. The groove 230*a* may alternately be referred to as an annular groove, while the thickness in the area A2 may be considered as a support section, reinforcement member, or the like.

The location of the bore 238 in the tool element 99 is typically standardized. In order to properly align with the bore 238 in the tool element 99, the bore 234 of the exemplary anvil 98*a* must be positioned in close proximity to the groove 230*a*. This results in a thin area A1 of material between the bore 234 and the groove 230*a*, which may be prone to breakage and failure, particularly when the nominal size W of the driving end portion 222 is ½ inch or less. In contrast, the anvil 98 of FIGS. 4-8 has a greater material thickness in the area A2 provided by the curved configuration of the groove 230. This advantageously increases the strength and durability of the anvil 98, while still providing the anvil 98 with multiple forms of tool element retention.

FIGS. 7 and 8 illustrate the pin 241 that is receivable in the through-holes of bores 234, 238 for one type of connection between the anvil 98 and the tool element 99. In operation of the impact wrench 10, a significant amount of impact force is transferred between the hammer lugs 112 and the anvil lugs 120 to ultimately impart rotation to the tool element 99. In such instances when the pin 241 is utilized, at least in part, to retain the tool element 99 to the anvil 98, the pin 241 may undergo a vector of force to assist in transmitting force to the tool element 99. Such force may be constrained between the bore 234 of the anvil 98 and the bore 238 of the socket or tool element 99. In these instances, the added amount of material in the area A2 provides additional strength and support. As can be seen in FIG. 7, the groove 230*a* and friction ring 240 are both contoured generally with the bore 234 on the anvil 98 to provide the added material in A2 without sacrificing a position or diameter of the bore 234 relative the anvil 98 compared to typical anvils for use with impact wrenches. Such improvement allows the anvil 98 to sill mate with existing socket and tool elements known in the art.

Although the disclosure has been described in detail with reference to certain preferred embodiments, variations and modifications exist within the scope and spirit of one or more independent aspects of the disclosure as described.

Various features of the invention are set forth in the following claims.

What is claimed is:

1. An impact tool comprising:
- a housing;
- a motor supported within the housing;
- an anvil extending from the housing, the anvil including
  - a body rotatable about a longitudinal axis,
  - a driving end portion configured to receive a tool element over a distal end thereof, and
  - a bore extending through the driving end portion of the anvil in a direction transverse to the longitudinal axis, the driving end portion including a groove located between the bore and the distal end,
- wherein the groove includes a curved portion converging toward the distal end, the groove being configured to receive a friction ring such that the friction ring follows a contour of the groove; and a drive assembly configured to convert a continuous rotational input from the motor to intermittent applications of torque to the anvil, the drive assembly including a camshaft driven by the motor and a hammer configured to reciprocate along the camshaft.

2. The impact tool of claim 1, wherein the bore extends through a first side and a second side of the driving end portion, the driving end portion including a first curved surface extending from the first side and a second curved surface extending from the second side.

3. The impact tool of claim 2, wherein the first curved surface and the second curved surface define the curved portion of the groove.

4. The impact tool of claim 1, wherein the bore is configured to receive a pin to selectively retain the tool element on the anvil.

5. The impact tool of claim 1, wherein the driving end portion includes a head having a T-shape profile in the direction transverse to the longitudinal axis.

6. The impact tool of claim 1, wherein the groove further includes a linear portion, and wherein the driving end portion includes a head including an inner surface extending over the linear portion of the groove.

7. The impact tool of claim 6, wherein the inner surface of the head defines a portion of the linear portion of the groove, such that the portion of the linear portion of the groove is formed between sides of the driving end portion and the inner surface of the head.

8. The impact tool of claim 1, wherein the driving end portion includes a first curved surface extending from a first side of the driving end portion, and a second curved surface extending from a second side of the driving end portion, wherein the first curved surface and the second curved surface are open toward the distal end to accommodate flexing of the friction ring.

9. The impact tool of claim 8, wherein the first curved surface defines a first curved portion of the groove, and the second curved surface defines a second curved portion of the groove, and wherein the groove further includes a linear portion extending between the first curved portion and the second curved portion of the groove, the linear portion being formed between opposing surfaces of the driving end portion.

10. An impact tool comprising:

a housing;

a motor supported within the housing; and a driving end portion extending from the housing along a longitudinal axis and configured to receive a tool element over a distal end thereof, the tool element being rotatable with the driving end portion in response to operation of the motor, the driving end portion including a plurality of sides defining an outer perimeter having a first width, a head defining an inner perimeter having a second width less than the first width, the head offset relative to the plurality of sides along the longitudinal axis, and a groove shaped to receive a friction ring configured to engage the tool element, the groove including a linear portion adjacent a first side of the plurality of sides and a curved portion adjacent a second side of the plurality of sides, wherein one of the linear portion and the curved portion is delimited by a surface of the head between the distal end and the plurality of sides along the longitudinal axis, and the other of the linear portion and the curved portion is open to the distal end.

11. The impact tool of claim 10, wherein the driving end portion further includes a bore extending therethrough along the first width, the bore extending from the second side of the plurality of sides.

12. The impact tool of claim 11, wherein the bore has a diameter, and wherein the curved portion follows a contour of the bore.

13. The impact tool of claim 10, wherein the linear portion is formed by a first longitudinally facing surface of the first side, and the curved portion is formed by a second longitudinally facing surface of the second side, and wherein the second longitudinally facing surface is closer than the first longitudinally facing surface to the distal end.

14. The impact tool of claim 13, wherein the driving end portion further includes a bore extending therethrough from the second side of the plurality of sides, and wherein the second longitudinally facing surface and the first longitudinally facing surface are closer than the bore to the distal end.

15. The impact tool of claim 14, wherein the head extends longitudinally away from each of the first longitudinally facing surface and the second longitudinally facing surface.

16. The impact tool of claim 10, wherein the head is positioned entirely within the outer perimeter, and wherein the friction ring is configured to extend at least partially beyond the outer perimeter.

17. The impact tool of claim 10, further comprising an anvil; and a drive assembly including a camshaft driven by the motor and a hammer configured to reciprocate along the camshaft, wherein the driving end portion is formed on the anvil.

18. The impact tool of claim 17, wherein the drive assembly is configured to convert a continuous rotational input from the motor to intermittent applications of torque to the anvil.

19. An impact tool comprising:

a housing;

a motor supported within the housing;

an anvil extending from the housing, the anvil configured to receive a tool element over a distal end thereof; and a drive assembly configured to convert a continuous rotational input from the motor to intermittent applications of torque to the anvil, wherein the anvil includes a bore extending therethrough, a curvilinear groove wrapping around the anvil between the bore and the distal end, and a curved support section formed between the bore and the curvilinear groove, the curved support section protruding into the groove to form a curved wall of the curvilinear groove, and wherein the curvilinear groove is configured to receive a friction ring that follows a contour of the curved support section.

20. The impact tool of claim 19, wherein the bore is configured to receive a pin to selectively retain the tool element on the anvil, the curved support section providing a reinforced area around the bore that is configured to engage the pin.

* * * * *